United States Patent [19]
Clarke et al.

[11] Patent Number: 6,036,282
[45] Date of Patent: Mar. 14, 2000

[54] RAILCAR AIR MOTOR DRIVEN GENERATOR

[75] Inventors: Bryan J. Clarke; Jeremy S. Waldrop, both of Aurora, Ill.

[73] Assignee: Zeftron, Inc., Montgomery, Ill.

[21] Appl. No.: 09/127,157

[22] Filed: Jul. 31, 1998

[51] Int. Cl.[7] .................................................. B60T 13/00
[52] U.S. Cl. ................................................. 303/7; 73/129
[58] Field of Search ..................... 188/153 R; 303/7; 105/35, 36; 73/129; 322/4; 213/1 R; 310/77

[56] References Cited

U.S. PATENT DOCUMENTS

| | | |
|---|---|---|
| 723,727 | 3/1903 | Pfeil . |
| 3,544,802 | 12/1970 | Burrell . |
| 3,972,380 | 8/1976 | Hudson et al. . |
| 4,021,690 | 5/1977 | Burton . |
| 4,052,109 | 10/1977 | Nagase et al. ............................ 303/25 |
| 4,071,282 | 1/1978 | Callahan et al. . |
| 4,128,800 | 12/1978 | Scott et al. . |
| 4,344,138 | 8/1982 | Frasier . |
| 4,414,462 | 11/1983 | Price . |
| 4,536,668 | 8/1985 | Boyer . |
| 4,539,497 | 9/1985 | Boyer . |
| 4,657,289 | 4/1987 | Boyer . |
| 4,761,577 | 8/1988 | Thomas et al. . |
| 5,215,156 | 6/1993 | Stulbach et al. . |
| 5,224,563 | 7/1993 | Iizuka et al. . |
| 5,267,473 | 12/1993 | Bezos et al. ............................ 73/129 |
| 5,335,974 | 8/1994 | Klink ..................................... 303/7 |
| 5,722,736 | 3/1998 | Cook ..................................... 303/15 |
| 5,738,417 | 4/1998 | Wood et al. ............................ 303/7 |

FOREIGN PATENT DOCUMENTS 41 26 624 A1   2/1993   Germany ..................... H02J 7/00

OTHER PUBLICATIONS

"Railmate Barrett Axle Generator," Barrett Engineering Inc., undated.

Primary Examiner—Paul N. Dickson
Assistant Examiner—Jeffrey Woller
Attorney, Agent, or Firm—Lloyd L. Zickert

[57] ABSTRACT

An electrical power generating system for a railcar to provide power for electrically driven accessories on the railcar which includes a generator driven by an air motor, wherein free air to the air motor is derived from air operating the braking system on the railcar, and particularly air that is exhausted to the atmosphere during braking operations.

26 Claims, 3 Drawing Sheets

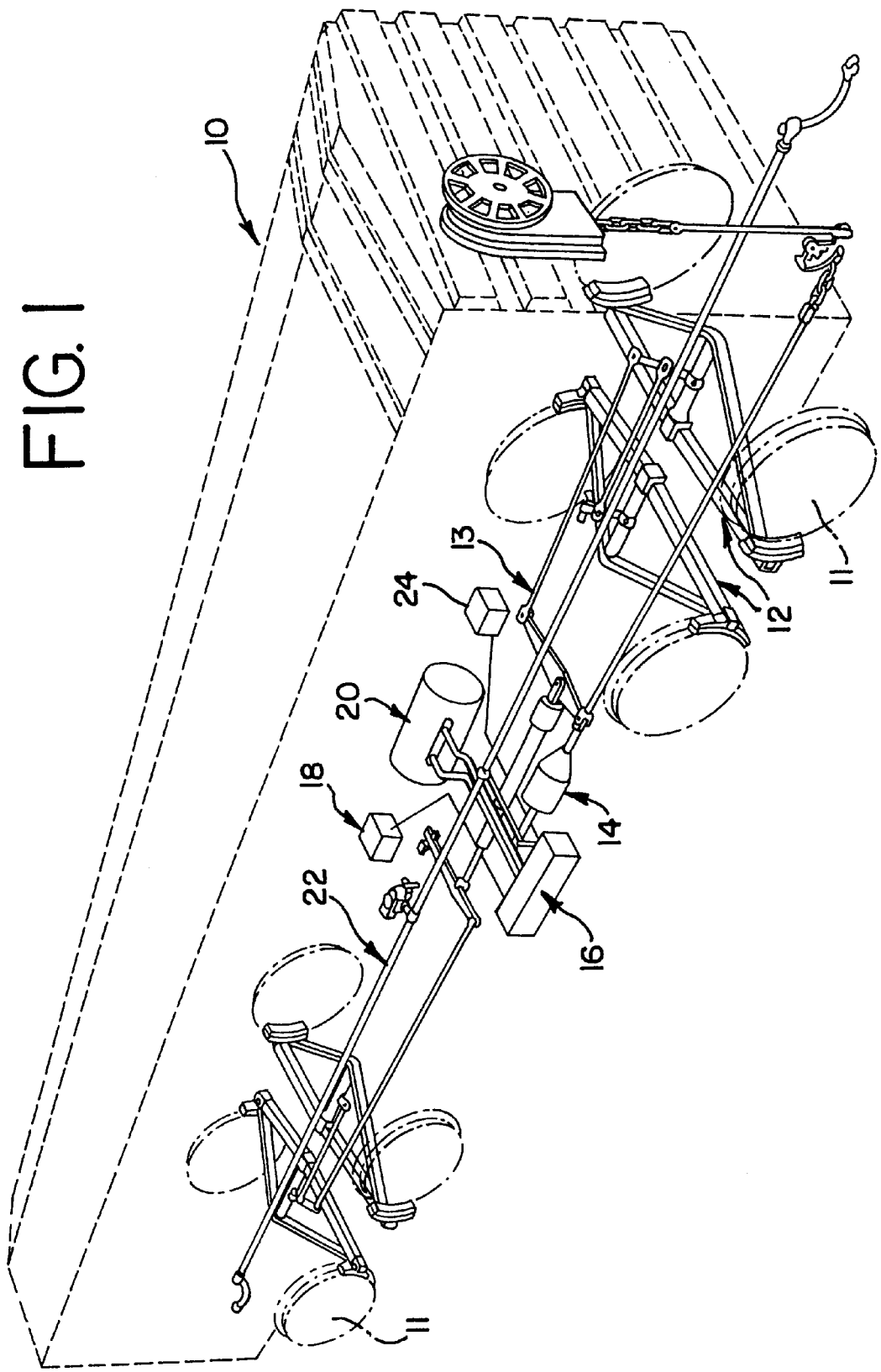

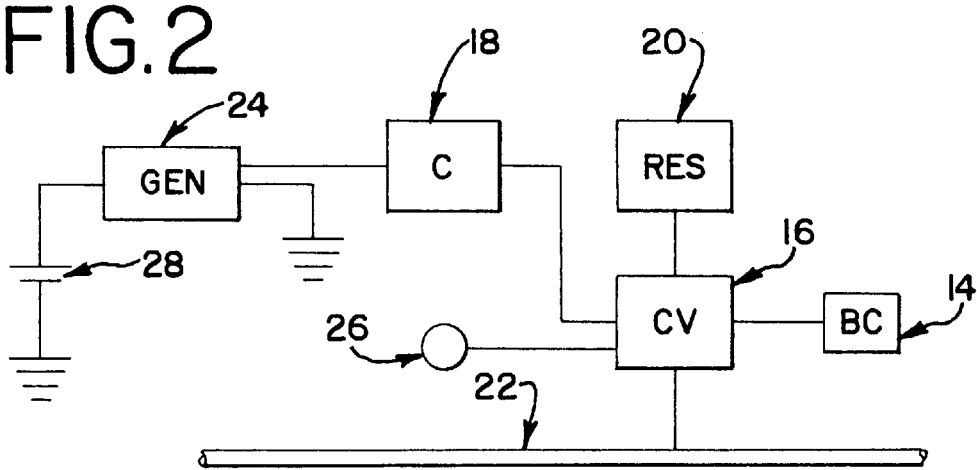
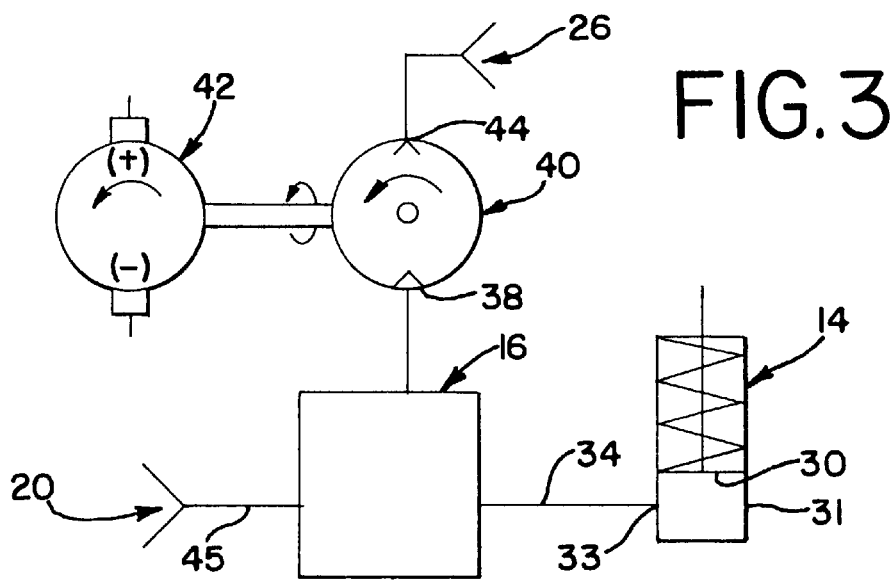

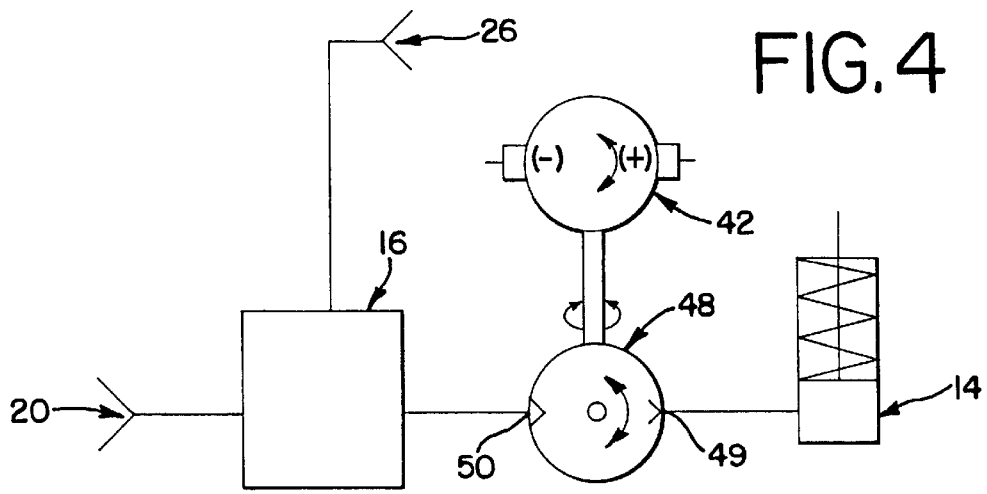
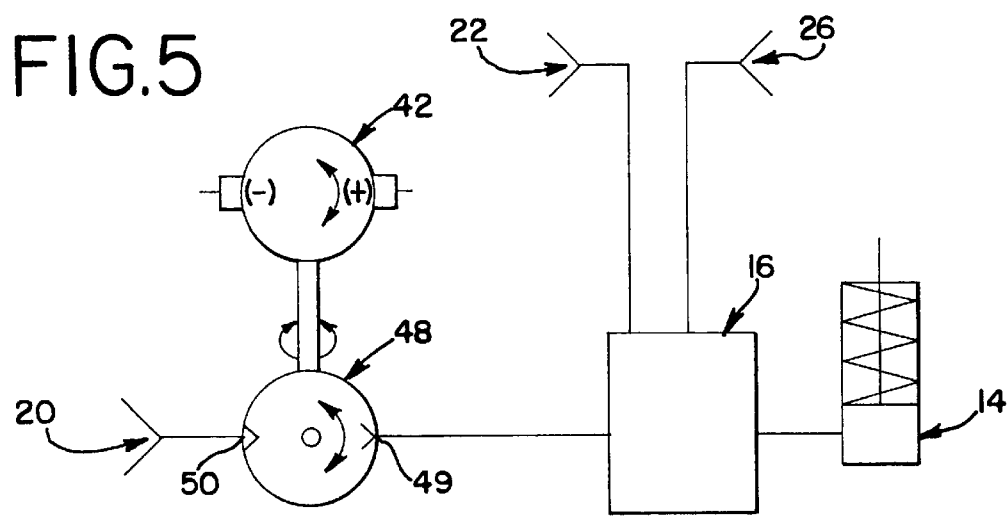

RAILCAR AIR MOTOR DRIVEN GENERATOR

DESCRIPTION

This invention relates in general to a railcar air motor driven generator, and more particularly to an air motor generator powered by air utilized by the air brake system on the railcar.

BACKGROUND OF THE INVENTION

With the advent of using more electrically driven accessories on railcars, there becomes a need for providing self-contained electrical power systems on each railcar to drive the accessories.

It is known that railcars, and particularly freight cars, have begun to utilize electropneumatic braking systems responsive to electric and radio signals and that are significantly more efficient than the well known and standard pneumatic braking systems responsive to pneumatic command signals. The importance of electropneumatic braking systems is significant where long trains are made up for hauling freight. For example, some freight trains may have as many as 150 cars and extend for nearly two miles in length. Where such a train is dependent upon a pneumatic or air-driven braking system that responds to pneumatic signals from the locomotive, time delays are experienced in relaying those signals along the train. These time delays increase the amount of time needed to slow or stop a train of this magnitude and also impact on the maintenance requirements for the cars.

The development and operation of electropneumatic braking systems, such as disclosed in U.S. Pat. No. 5,722,736 and the PCT Publication No. WO 97/19844, require the use of electrical energy to drive the controller of the system. In these systems, each car includes its own electrically driven controller that responds to electric signals from the locomotive for operating the brake system of the car. It has been generally recognized that hard wiring along the train provides electrical energy for driving the controllers. This arrangement works particularly well if every railcar on the train is equipped with an electropneumatic braking system. Inasmuch as only a small number of railcars are presently equipped with electropneumatic braking systems, the advantage of using such a system on a train is at least partially lost where a train is made up with railcars having both electropneumatic and pneumatic braking systems which requires the electropneumatic systems to be responsive to pneumatic signals. A system responsive to either electric or pneumatic signals is referred to as an overlay or universal system. It should also be appreciated that railcars having only pneumatic braking systems are not fitted with wiring systems for passing electrical energy between railcars.

Therefore, a need is present for the use of self-contained power systems for railcars for not only driving controllers on electropneumatic braking systems but any other accessories such as signal lights at the end of the train.

Heretofore, it has been known to provide axle driven generators for land vehicles and even where those generators are driven by power taken from the wheels of the vehicle during movement of the vehicle. Such power generating systems are disclosed in U.S. Pat. Nos. 3,972,380; 4,021,690; 4,536,668; 4,539,497; 4,657,289; 4,761,577; 5,215,156; and 5,224,563.

It has been known to provide axle driven generators for railcars as disclosed in U.S. Pat. Nos. 723,727; 3,544,802; 4,071,282; 4,414,462; and 5,775,229. It has also been known to drive a hydraulic pump from a railcar axle that in turn drives a hydraulic motor that drives an alternator, as disclosed in U.S. Pat. No. 4,128,800. It has also been known that axle driven generators for railcars have been developed by Barrett Engineering, Inc. of San Diego, Calif., Ellcon National Inc. of Greenville, S.C., and The Timken Company.

Although the axle driven generators for railcars driven by the axles of a railcar produce a self-contained power generator, difficulties have been experienced not only in mounting the generators on a railcar but also maintaining them in satisfactory working operation. Accordingly, a need has been recognized for a self-contained power generating system that overcomes these problems.

While it has been proposed to drive air motor generators from brake pipe air or from supply reservoir air, such an arrangement would adversely affect brake application functions because the air capacity for operating a brake system would be reduced to the extent that braking capacity would be reduced to severely endanger the braking ability of the system. Moreover, air reductions of brake pipe pressure caused by exhausting brake pipe pressure to atmosphere through an air motor could create false pneumatic commands for the braking system, thereby causing malfunctioning of the system.

SUMMARY OF THE INVENTION

The electrical power generating system of the present invention overcomes the problems experienced with axle mounted generators in that the power generating system of the present invention can easily be packaged for mounting at any suitable place on a railcar and is powered by air supplied to or exhausted from the pneumatic brake system during brake application or release functions. Further, the system of the present invention provides an air motor generating system that avoids any adverse impact on the operation of a brake system, and precludes the generation of any false pneumatic commands that could cause malfunctioning of the brake system. The electric power system of the present invention includes a suitable generator driven by an air motor that derives its power from free air utilized in the operation of a brake system on a railcar. The term "free air" as used in conjunction with the present invention constitutes air that does not emanate directly from the brake pipe or supply reservoir and thereafter be exhausted by the air motor to atmospheric exhaust. Thus, air that may be exhausted to atmosphere from a brake release function, or for charging the supply reservoir or be used for a brake application function constitutes "free air." The air motor may be driven by the exhaust from the brake cylinder, or it may be driven by a combination of the brake application air to the brake cylinder and the exhaust air from the brake cylinder.

It will be appreciated that the electric power generated by the generator will serve to maintain a suitable power level in one or more storage batteries or devices that in turn will provide electrical energy to an accessory on a railcar, such as a controller in an electropneumatic braking system. The generator may be either of the alternating current or direct current type and is preferably connected into a capacitive regulating circuit to integrate and extend an intermittent constant charging voltage.

It is therefore an object of the present invention to provide a self-contained electrical power generating system for a railcar that utilizes free air from the pneumatic brake system on the railcar.

It is a further object of the present invention to provide a railcar air motor driven generator that is driven by the air exhausted from the brake cylinder during a brake release operation.

A still further object of the present invention is to provide railcar air motor driven generator that is driven by the brake application air and/or the brake release air in a braking system operating a brake cylinder.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of a railcar in phantom with parts of a braking system shown in solid line that includes the electrical power system according to the present invention and which is illustrated in block form;

FIG. 2 is a schematic block diagram of the electrical power generating system of the present invention as associated with the electropneumatic brake system of a railcar;

FIG. 3 is a schematic diagram of one embodiment of the present invention, wherein the air motor is driven by the exhaust air from the brake cylinder during a brake release operation;

FIG. 4 is a schematic view of a further embodiment of the present invention, wherein the air motor is reversible and driven during both brake application and brake release operations of the brake cylinder; and FIG. 5 is a schematic diagram of a still further embodiment of the present invention, wherein the air motor is a reversing type and driven by air from the supply reservoir as used by the control valve during the braking operation and air from the brake pipe utilized to replenish the air supply in the supply reservoir.

DESCRIPTION OF THE INVENTION

Referring now to the drawings, and particularly to FIG. 1, a railcar is shown in phantom, together with an electropneumatic braking system for driving the brakes of the railcar, and the electric power system of the present invention. The railcar is generally designated by the numeral 10 and includes a plurality of wheels 11 that would be carried on axles of trucks for the railcar. A brake beam and brake shoes 12 are provided for each pair of wheels and a pair of brake beams is utilized on each truck of the railcar. The brake beams are driven by a linkage system 13 that is in turn driven by a brake cylinder 14. Most railcars are provided with a single acting spring return air cylinder that will be primarily referred to hereafter as the brake cylinder 14 for driving the brakes on the railcar. It will be appreciated that some railcars include more than one brake cylinder, particularly where extremely heavy loads are anticipated.

Brake application and brake release functions for the brake cylinder 14 are made by operation of the control valve 16 which in turn in an electropneumatic system receives commands from an electronic controller 18. It will be appreciated that the electronic controller will receive signals from the locomotive for operating the brake system of the railcars.

Air to the control valve for operating the brake cylinder is supplied by a supply reservoir 20, the pressure in which is maintained at a predetermined level by the brake pipe 22. The supply reservoir on a railcar may consist of either an auxiliary reservoir, an emergency reservoir, or a combination of both the auxiliary and emergency reservoirs. The supply reservoir and the brake pipe are connected into the control valve which maintains the desired level of pressure in the supply reservoir during normal operation of the braking system. It will be understood that the braking system forms no part of the present invention in that the invention is in a free air driven electric generating system to provide power to the controller 18 or other electrically driven accessory carried by the railcar. A type of electropneumatic braking system for railcars is disclosed in U.S. Pat. No. 5,722,736, and the subject matter of this patent is incorporated by reference for support of brake operations described herein and otherwise. It may be appreciated that reference herein to an electropneumatic braking system may be interpreted to refer to an electropneumatic system with or without an overlay that may be responsive to both electric command or pneumatic command signals. It is also understood that the brake pipe extends throughout the train and is supplied by air generated from a compressor on the locomotive. Suitable couplings are provided at each end of a railcar for connection to the brake pipe element of adjacent railcars or locomotives.

The electric power generating system of the present invention is generally indicated by the numeral 24 which is driven by free air during operation of the electropneumatic brake system of the railcar and which supplies electrical power to the controller 18 of that system.

Referring now to FIG. 2, the elements of the electropneumatic brake system and the electric power generator of the present invention are illustrated in block form, wherein the brake pipe 22 connects into the control valve 16 which in turn is connected to the supply reservoir 20 as well as the brake cylinder 14. Also shown is a retainer exhaust valve 26 connected to the control valve which would normally exhaust used air from the pneumatic brake system during its operation. The electronic controller 18 is illustrated as being connected to the control valve to provide signals to suitable solenoids in the control valve for carrying out the desired braking operations.

The electric power generating system 24 would include an air motor driven generator and a storage battery or device 28, all of which are suitably connected to the controller for providing power to the controller.

As explained above, the air driven generator of the present invention generally derives its power from the operating air pressure for the braking system.

Preferably, the air motor will be driven by air pressure utilized for the brake application and/or brake release functions of the braking system.

The embodiment shown in FIG. 3 illustrates a brake cylinder 14 having a piston 30 reciprocally received in the cylinder 31 and driving a piston rod 32 which in turn is connected to the linkage of the brake beams. The cylinder would include a single inlet/outlet port 33. The port 33 is in turn connected to an exhaust pipe 34 going to the control valve 16. The air driving the air motor 40 would be exhausted to atmosphere through the retainer valve 26 and produce no work if the air motor was not in the exhaust line 41. Thus, the air is free and used to generate electricity in the present invention. The air motor includes a shaft connecting directly to the shaft of a generator 42 which, as above explained, may be of the AC or DC type. The generator then produces electrical energy for the storage battery 28 and ultimately for the controller 18. The air motor 40 includes an outlet port 44 that in this embodiment is connected to the retainer valve 26. The supply reservoir 20 is connected to the control valve 16 through a supply reservoir pipe 45.

Accordingly, in the embodiment of FIG. 3, electrical energy is generated in the power system of the invention solely by the exhaust air of the brake cylinder during a brake release function which exhaust air normally would be exhausted to atmosphere through the retainer valve. The exhaust air from the brake cylinder during the brake release function is delivered to the air motor inlet port 38 and which exits from the air motor through the outlet port 44 and then through the retainer valve 26 to atmosphere. Accordingly, the air motor is installed in the retainer valve line extending from the control valve 16. Thus, electrical energy for the controller is produced in this embodiment by air pressure that would normally be wasted. It will be appreciated that the piping to and from the air motor may be enlarged to obtain the maximum benefit for driving the air motor.

The air motor 40 in FIG. 3 is a one-way motor, wherein the output shaft will only be driven in one direction. However, it will be appreciated particularly below that the air motor may also be of a reversing type depending on the system requirements. A reversing motor is designed to have its shaft rotate clockwise or counter-clockwise depending upon which port receives the higher air pressure. In a reversing motor both ports act as inlet and outlet ports, and the work drives the generator to produce electric energy.

It should also be appreciated that air motors of the one-way or reversing types may include a vane motor, a gear motor, a turbine motor, or a piston motor. One satisfactory air motor that may be used in the present invention is an air vane motor which is available from several U.S. manufacturers.

Another embodiment of the invention is shown in FIG. 4, wherein the air motor is of the reversing type and generally designated by the numeral 48. This air motor includes one port 49 connected to the brake cylinder and the other port 50 connected to the control valve 16. Again, it may be necessary to increase the piping size to and from the air motor. Accordingly, free flowing air from the control valve to the brake cylinder during the braking application to extend the brake cylinder and apply the brakes will generate shaft work from the air motor in one direction, while free air exhausted from the brake cylinder during a brake release function will generate shaft work from the air motor in the opposite direction. The generator 42 is driven by rotation of the air motor in both directions for producing electrical energy for the energy storage means and which is usable by the controller. Accordingly, electrical power is generated during both the brake application and brake release functions of the system.

Referring now to the embodiment of FIG. 5, a downstream supply provides air driving pressure to a reversing air motor 48. One port of the air motor 48 is connected to the supply reservoir 20, and the other is connected to the control valve 16. As in the other embodiments, the piping to and from the air motor may be increased in size to assure the flow of an adequate volume of air to drive the air motor. In this embodiment air coming from the brake pipe and used to charge the supply reservoir 20 will flow through the reversing air motor 48 to generate shaft work in one direction and drive the generator 42. Shaft work from the air motor will be generated in the other direction during the brake application function when air is utilized by the control valve from the supply reservoir 20 to expand the brake cylinder. Air going in both directions is free because the air does not deplete the supply reservoir air or produce any drop in brake pipe pressure that could cause any false pneumatic command signals recognizable by adjacent cars, and the air is normally used for charging the supply reservoir and for a brake application function. Accordingly, the air motor will be driven during the charging of the supply reservoir and the brake application function.

In view of the foregoing, it can be appreciated that the power generating system of the present invention is self-contained on a railcar and operable by free air from the operation of the pneumatic brake system.

It will be understood that modifications and variations may be effected without departing from the scope of the novel concepts of the present invention, but it is understood that this application is to be limited only by the scope of the appended claims.

The invention is hereby claimed as follows:

1. In a railcar, a brake pipe, an air brake system connected to the brake pipe, brake cylinder operating brakes on the railcar, a supply reservoir, a control valve operable to cause brake application and release functions, and an electrically driven accessory, the improvement in a self-contained power system on the railcar for supplying electrical energy to said accessory, said power system comprising a generator, electrical storage means connectable to and chargeable by said generator, an air motor for driving said generator, and means supplying free air from said air brake system during operation of the system for driving said air motor.

2. The self-contained power system of claim 1, wherein said free air supplying means comprises a line connection or pipe to the brake cylinder.

3. The self-contained power system of claim 2, wherein said air motor is one way and driven by the exhaust from a brake cylinder release function.

4. The self-contained power system of claim 2, wherein said air motor is reversing and driven by free air flow from a brake application or a brake release function.

5. The self-contained power system of claim 1, wherein said air supplying means comprises a line connection between said supply reservoir and said control valve, and said air motor is reversing, whereby free air from the brake pipe used to charge the supply reservoir and free air from the supply reservoir for a brake application function will drive the air motor.

6. The self-contained power system of claim 1, wherein said motor is one way.

7. The self-contained power system of claim 1, wherein said motor is reversing.

8. The self-contained power system of claim 1, wherein said air brake system is electropneumatic.

9. The self-contained power system of claim 1, wherein said air brake system is responsive to electric and/or pneumatic commands.

10. A self-contained electric power system for a railcar connected to a locomotive, wherein the railcar includes a brake pipe connectable to an air supply from the locomotive, at least one brake cylinder for operating brakes on the railcar, an air supply reservoir, and an electropneumatic brake system for operating the brake cylinder, and said brake system including a control valve controlling air pressure in said supply reservoir and the brake cylinder for brake application and release functions, and an electrically powered controller receiving power from said power system and operating the control valve, and said power system comprising an air motor, a generator driven by said air motor, a storage battery connected to and chargeable by said generator, and means supplying free air from said brake system to drive said air motor.

11. The system of claim 10, wherein said air motor includes an inlet port for connection to a high pressure source and an outlet port for connection to a low pressure line, and said means supplying air includes connecting the inlet and outlet ports between the supply reservoir and said control valve, whereby free air from the brake pipe charging the supply reservoir and free air from the supply reservoir to produce a brake application function drives said air motor.

12. The system of claim 10, wherein said air motor includes an inlet port for connection to a high pressure source and an outlet port for connection to a low pressure line, and said means supplying free air includes a pipe extending between the air supply and said control valve.

13. The system of claim 10, wherein said free air supplying means comprises a line connection or pipe to the brake cylinder.

14. The system of claim 10, wherein said air motor is one way and driven by the exhaust from a brake cylinder release function.

15. The system of claim 10, wherein said air motor is reversing and driven by free air flow from a brake application or a brake release function.

16. The system of claim 10, wherein said air motor is one way.

17. The system of claim 10, wherein said air motor is reversing.

18. The system of claim 10, wherein said brake system is responsive to electric and/or pneumatic commands.

19. In a railcar having an electropneumatic brake system for operating a brake cylinder means driving brakes on the railcar, said system including an air supply, a control valve connected to the air supply and the brake cylinder means, and an electrically powered controller driving said control valve, the improvement being in an air driven electrical generating means on said railcar for supplying electrical energy to said controller, said generating means including a generator, an air motor driving said generator, a storage battery connected to and chargeable by said generator, and means supplying free air to said air motor for driving said motor.

20. The improvement of claim 19, wherein the air motor is one way.

21. The improvement of claim 19, wherein the air motor is reversing.

22. The improvement of claim 19, wherein said means supplying free air includes a line connection to the brake cylinder.

23. The improvement of claim 19, wherein said air motor is one way and driven by the exhaust from a brake cylinder release function.

24. The improvement of claim 19, wherein said air motor is reversing and driven by free air flow from a brake application or a brake release function.

25. The improvement of claim 2, wherein said air motor is one way.

26. The improvement of claim 2, wherein said air motor is reversing.

* * * * *